(12) United States Patent
Wolters et al.

(10) Patent No.: US 9,902,124 B2
(45) Date of Patent: Feb. 27, 2018

(54) ROBUST PLANAR COMPOSITE WITH AN INTERMEDIATE LAYER OF INCREASED VICAT SOFTENING TEMPERATURE

(75) Inventors: Michael Wolters, Heinsberg (DE); Stefan Pelzer, Herzogenrath (DE)

(73) Assignee: SIG Technology AG, Neuhausen (CH)

( * ) Notice: Subject to any disclaimer, the term of this patent is extended or adjusted under 35 U.S.C. 154(b) by 1069 days.

(21) Appl. No.: 14/234,670

(22) PCT Filed: Jul. 23, 2012

(86) PCT No.: PCT/EP2012/003095
§ 371 (c)(1),
(2), (4) Date: Apr. 24, 2014

(87) PCT Pub. No.: WO2013/013802
PCT Pub. Date: Jan. 31, 2013

(65) Prior Publication Data
US 2014/0242311 A1    Aug. 28, 2014

(30) Foreign Application Priority Data

Jul. 26, 2011    (DE) .................. 10 2011 108 401

(51) Int. Cl.
*B32B 1/02*    (2006.01)
*B32B 7/02*    (2006.01)
(Continued)

(52) U.S. Cl.
CPC ............. *B32B 1/02* (2013.01); *B31B 50/26* (2017.08); *B32B 3/266* (2013.01); *B32B 7/02* (2013.01);
(Continued)

(58) Field of Classification Search
CPC .... B32B 1/02; B32B 7/02; B32B 7/12; B32B 15/08; B32B 15/20; B32B 27/08;
(Continued)

(56) References Cited

U.S. PATENT DOCUMENTS

| 5,716,570 A | 2/1998 | Peiffer et al. |
| 5,783,269 A | 7/1998 | Heilmann et al. |

(Continued)

FOREIGN PATENT DOCUMENTS

| CN | 201587629 U | 9/2010 |
| JP | 11300913 | 2/1999 |

(Continued)

OTHER PUBLICATIONS

International Search and Written Opinion for PCT/EP2012/003094, dated May 26, 2013.
(Continued)

*Primary Examiner* — Michael C Miggins
(74) *Attorney, Agent, or Firm* — Meunier Carlin & Curfman LLC

(57) ABSTRACT

The present invention generally relates to a sheetlike composite (3) comprising a layer configuration with the following layers: 0. optionally a layer of thermoplastic KSu (13); 1. a carrier layer (4); ii. a first layer of thermoplastic KSv (35); iii. a barrier layer (5); iv. a second layer of thermoplastic KSa (6); v. at least one further layer of thermoplastic KSw (7); wherein the Vicat softening temperature of the layer of thermoplastic KSv (35) and the Vicat softening temperature of the layer of thermoplastic KSa (6) is in each case higher than the Vicat softening temperature of the layer of thermoplastic KSw (7). The present invention furthermore relates to a process for the production of the sheetlike composite, a container which surrounds an interior and comprises at least one such sheetlike composite, and a process for the production of this container.

30 Claims, 9 Drawing Sheets

Figure 1:
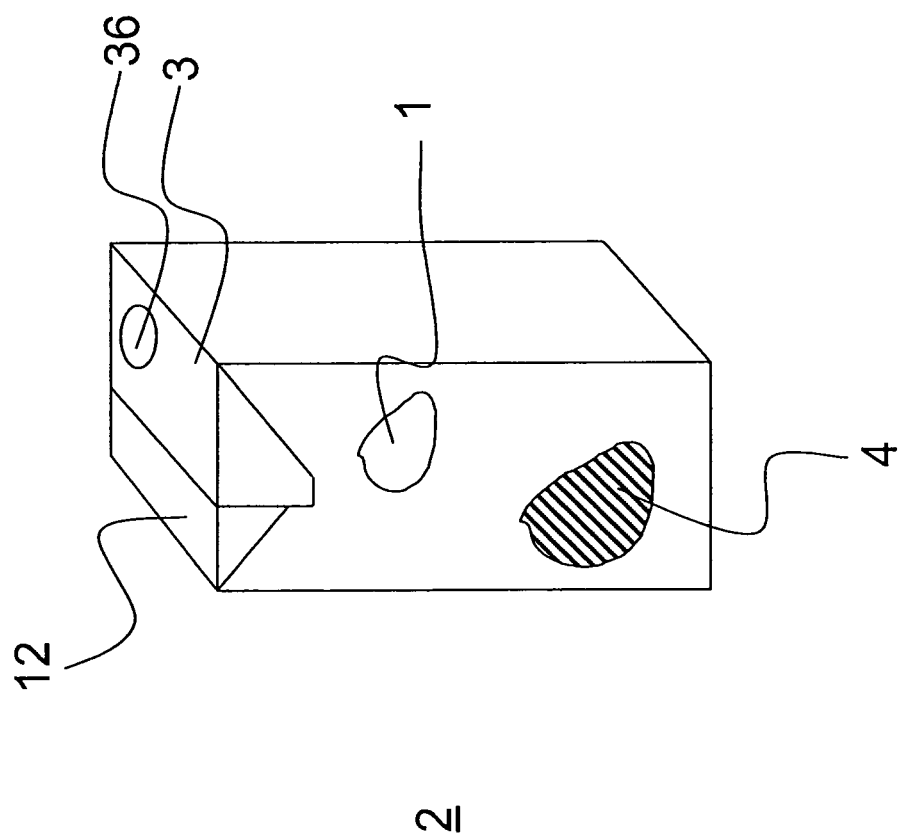

(51) Int. Cl.
*B32B 7/12* (2006.01)
*B32B 15/08* (2006.01)
*B32B 15/20* (2006.01)
*B32B 27/08* (2006.01)
*B32B 27/10* (2006.01)
*B32B 27/30* (2006.01)
*B32B 27/32* (2006.01)
*B32B 3/26* (2006.01)
*B31B 50/26* (2017.01)

(52) U.S. Cl.
CPC ............... *B32B 7/12* (2013.01); *B32B 15/08* (2013.01); *B32B 15/20* (2013.01); *B32B 27/08* (2013.01); *B32B 27/10* (2013.01); *B32B 27/308* (2013.01); *B32B 27/32* (2013.01); *B32B 27/327* (2013.01); *B32B 2250/05* (2013.01); *B32B 2270/00* (2013.01); *B32B 2307/516* (2013.01); *B32B 2307/718* (2013.01); *B32B 2307/7244* (2013.01); *B32B 2307/7246* (2013.01); *B32B 2307/7265* (2013.01); *B32B 2439/62* (2013.01); *B32B 2439/70* (2013.01); *Y10T 428/1352* (2015.01); *Y10T 428/24331* (2015.01); *Y10T 428/24942* (2015.01)

(58) Field of Classification Search
CPC ....... B32B 27/10; B32B 27/308; B32B 27/32; B32B 27/327; B32B 3/266; B32B 2250/05; B32B 2270/00; B32B 2307/516; B32B 2307/718; B32B 2307/7244; B32B 2307/7246; B32B 2307/7265; B32B 2439/62; B32B 2439/70; Y10T 428/24331; Y10T 428/1352; Y10T 428/24942; B31B 50/26
See application file for complete search history.

(56) References Cited

U.S. PATENT DOCUMENTS

| 6,127,043 | A  | 10/2000 | Lange |
| 6,872,459 | B1 | 3/2005  | Frisk et al. |
| 6,974,612 | B1 | 12/2005 | Frisk et al. |
| 2005/0037162 | A1 | 2/2005 | Adams |
| 2005/0074621 | A1 | 4/2005 | Reighard et al. |
| 2005/0175800 | A1 | 8/2005 | Staffetti et al. |
| 2008/0113133 | A1 | 5/2008 | Fackler et al. |
| 2013/0164551 | A1 | 6/2013 | Daum |

FOREIGN PATENT DOCUMENTS

| JP | 2002120340 A | 4/2002 |
| JP | 2003221024 A | 8/2003 |
| JP | 2004010067 A | 1/2004 |
| JP | 2004330420 A | 11/2004 |
| JP | 2006205592 A | 8/2006 |
| JP | 2009073007 A | 4/2009 |
| JP | 2010058625 A | 3/2010 |
| WO | 9009926 A2 | 9/1990 |
| WO | 9826994 A1 | 6/1998 |
| WO | 2005018932 | 3/2005 |
| WO | 2006068585 A1 | 6/2006 |
| WO | 2007095667 A1 | 8/2007 |
| WO | 2011029597 A1 | 3/2011 |
| WO | 2011047871 | 4/2011 |

OTHER PUBLICATIONS

International Search and Written Opinion for PCT/EP2012/003095, dated May 26, 2013.
Related copending U.S. Appl. No. 14/234,688, filed Jan. 24, 2014 (and its prosecution history).

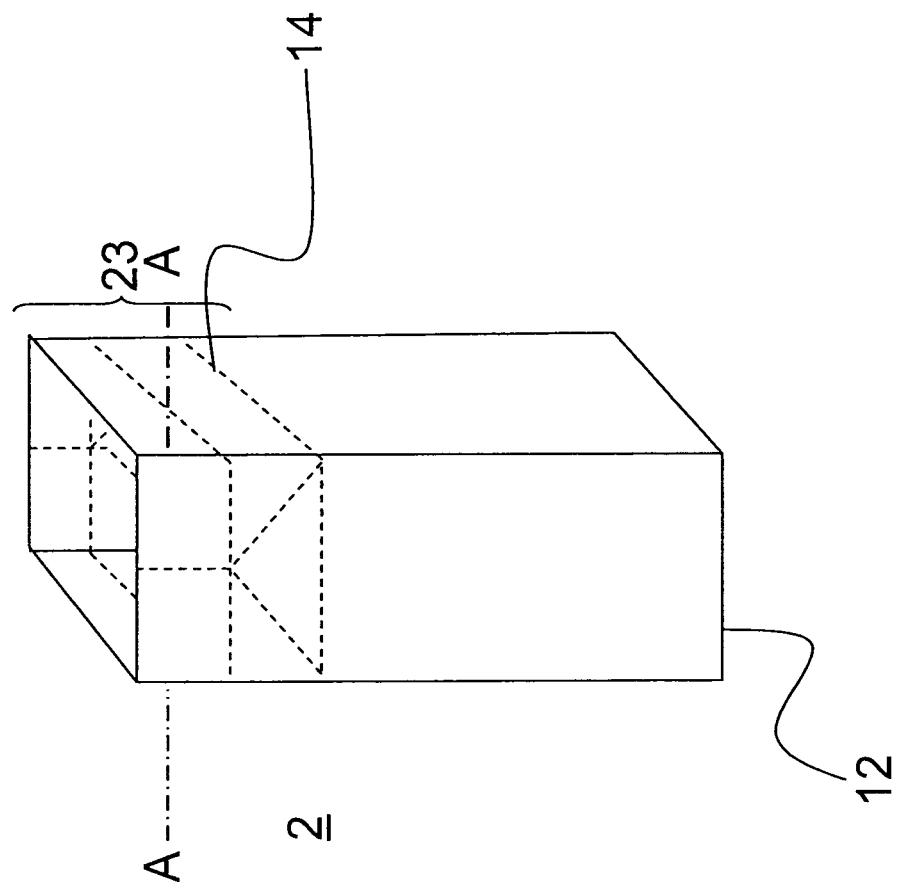

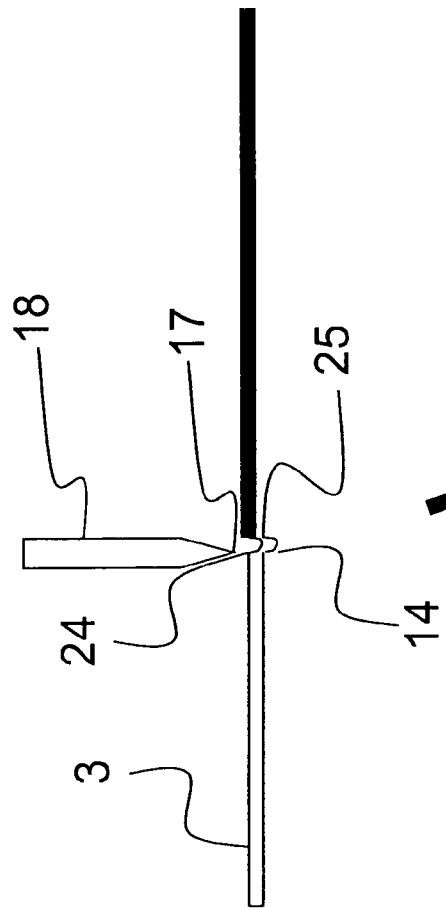
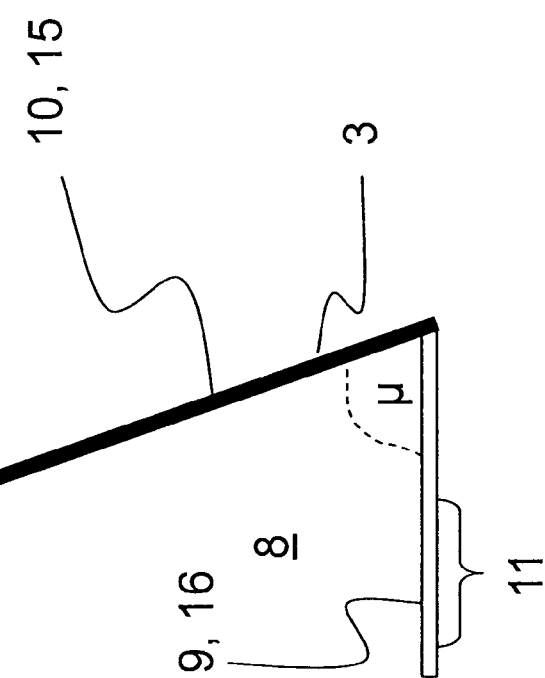
Fig. 4a
Fig. 4b

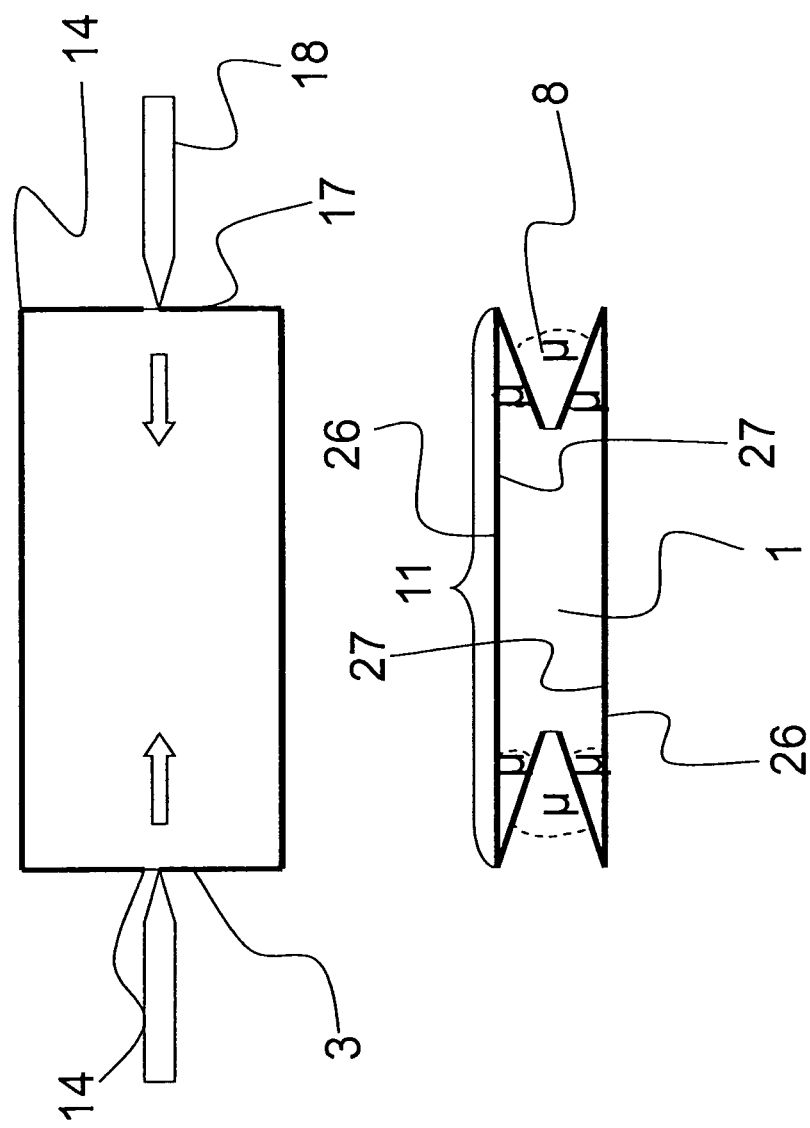

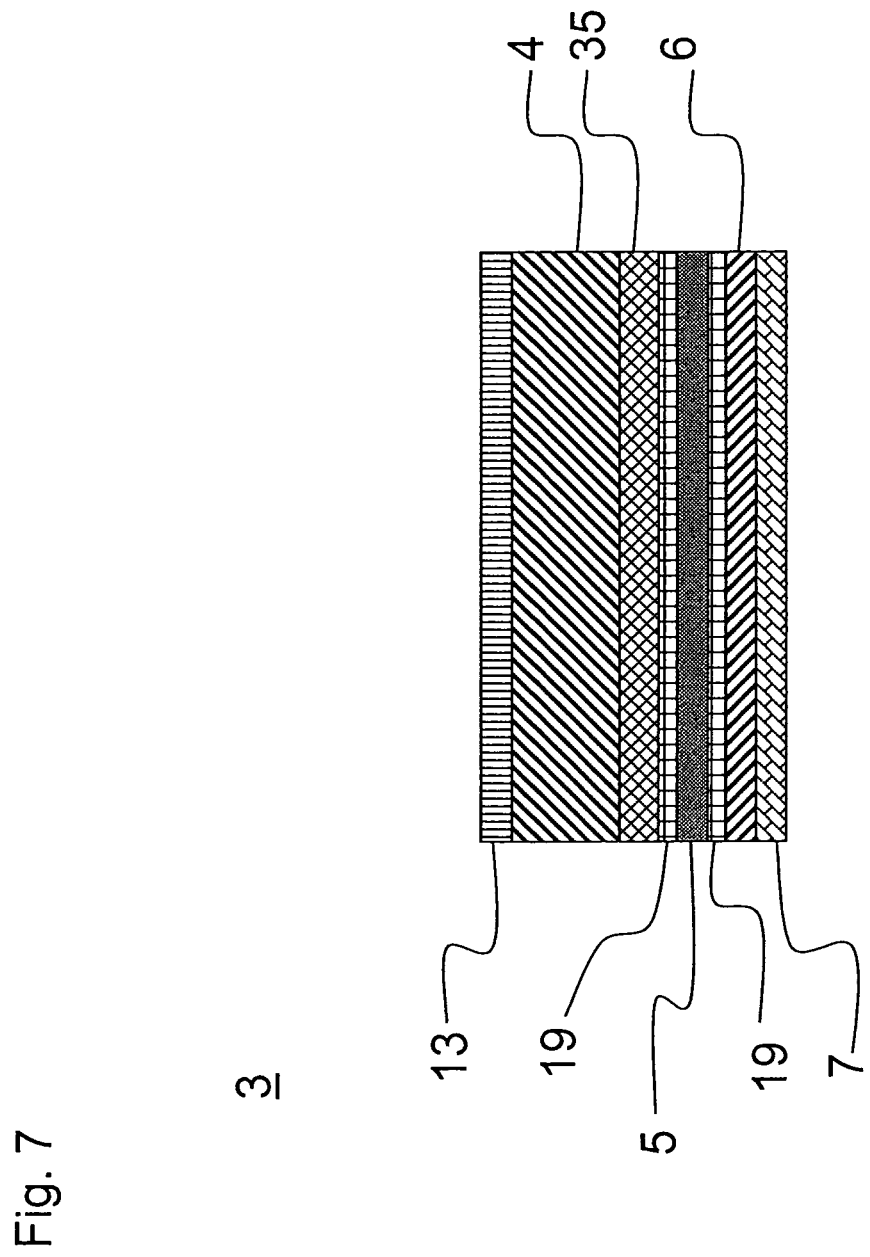

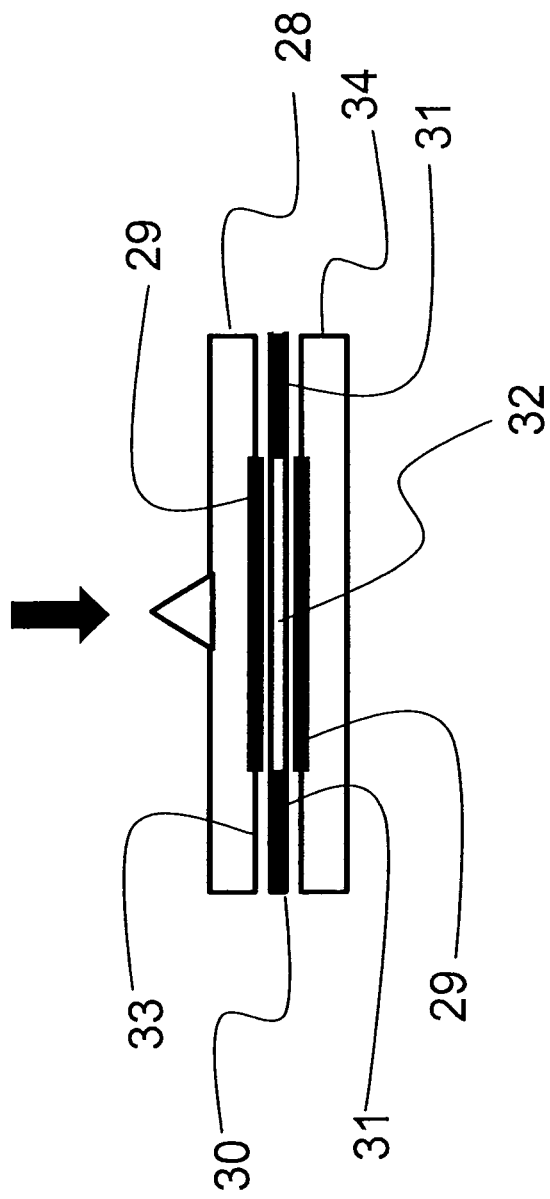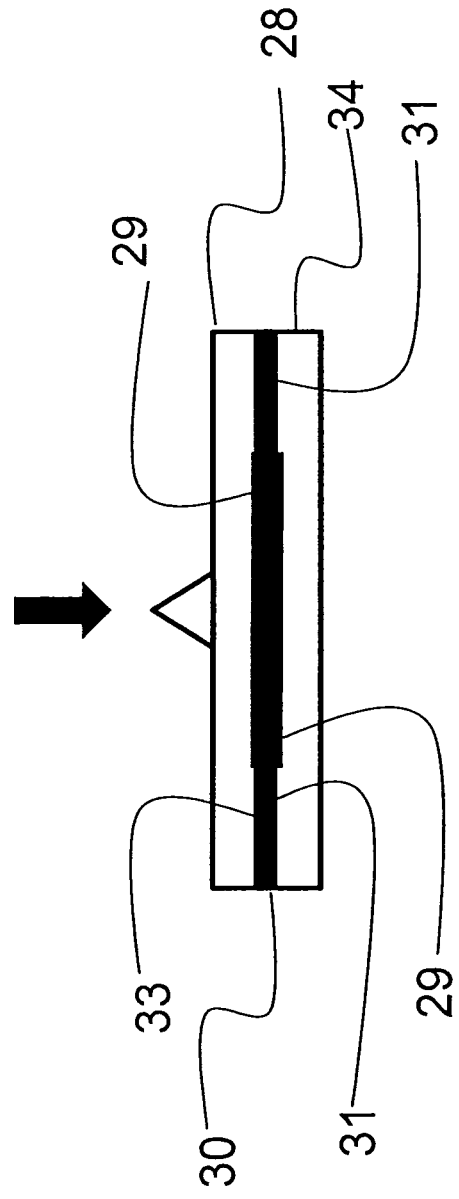
Fig. 8a
Fig. 8b

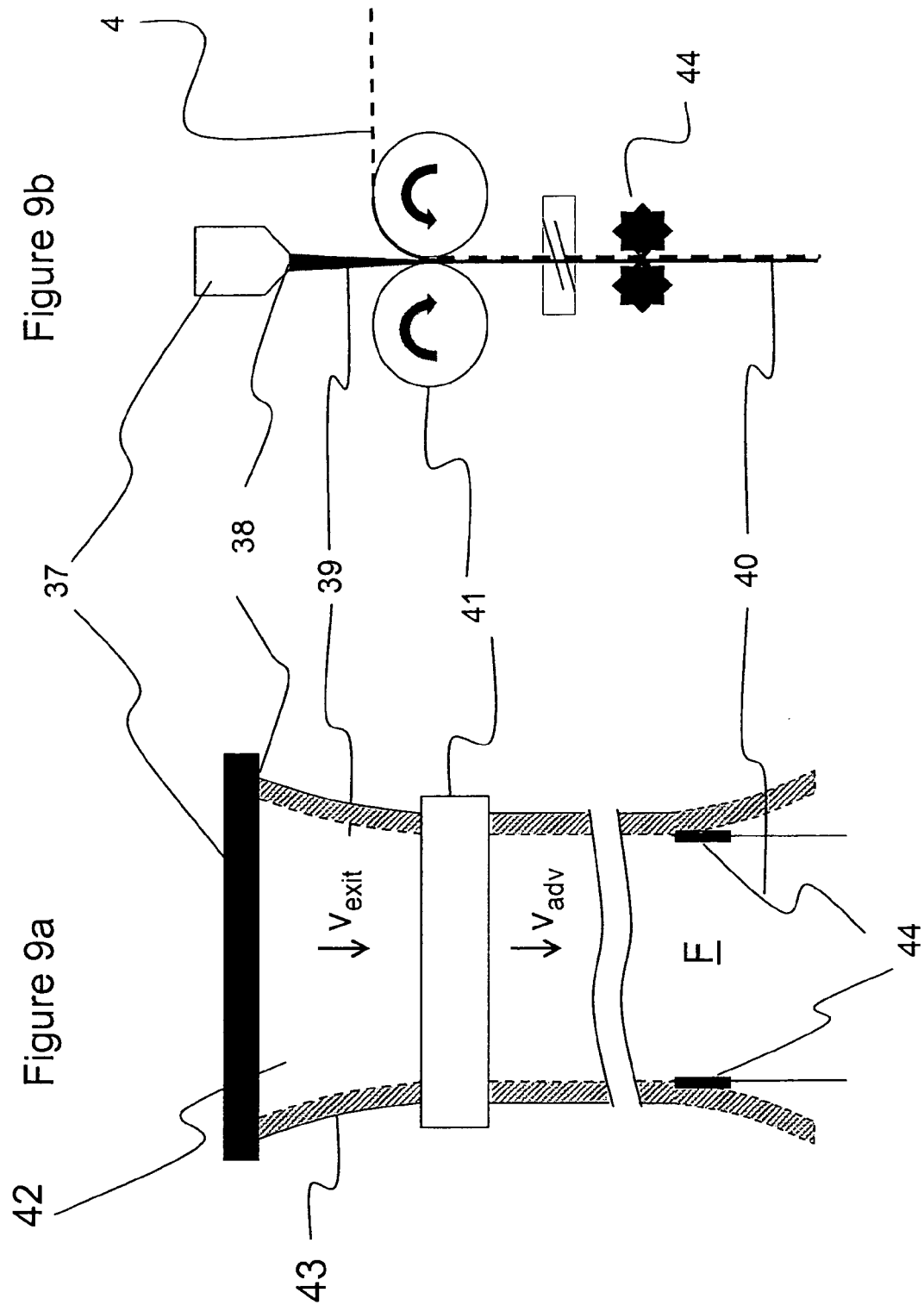

ROBUST PLANAR COMPOSITE WITH AN INTERMEDIATE LAYER OF INCREASED VICAT SOFTENING TEMPERATURE

FIELD

The present invention generally relates to a sheetlike composite comprising a layer configuration with the following layers:
- o. optionally a layer of thermoplastic KSu;
- i. a carrier layer;
- ii. a first layer of thermoplastic KSv;
- iii. a barrier layer;
- iv. a second layer of thermoplastic KSa;
- v. a third layer of thermoplastic KSw, The present invention further relates to a process for the production of the sheetlike composite, a container which surrounds an interior and comprises at least one such sheetlike composite, and a process for the production of this container.

BACKGROUND

For a long time foodstuffs, whether foodstuffs for human consumption or also animal feed products, have been preserved by being stored either in a can or in a glass jar closed with a lid. However, these packaging systems have some serious disadvantages, inter alia the high intrinsic weight, the energy-intensive production and the troublesome opening.

Alternative packaging systems for storing foodstuffs for a long period of time as far as possible without impairment are known from the prior art. These are containers produced from sheetlike composites—often also called laminate. Such sheetlike composites are often built up from a layer of thermoplastic, a carrier layer usually made of cardboard or paper, an adhesion promoter layer, an aluminium layer and a further layer of plastic. Such a sheetlike composite is disclosed, inter alia, in WO 90/09926. Such laminated containers already have many advantages over the conventional glass jars and cans, for example space-saving storage and low intrinsic weight. Nevertheless, possibilities for improvement also exist for these packaging systems.

In regions of the sheetlike composites which are exposed to high mechanical stresses during production of the container, in particular if barrier layers of aluminium foil are employed, the formation of small defects, such as cracks, fractures, blisters or non-sealed pockets or microchannels up to leaks, thus occurs again and again. Germs can be deposited in such defects, or even penetrate into the containers, as a result of which the foodstuff in the container may decay more easily. Any damage to the barrier layer furthermore leads to trouble spots in respect of entry of oxygen into the container, which in turn leads to losses in the quality of the foodstuff and also to a shortened shelf life. Regions which contain scores or folded edges or weaknesses in the sheetlike composite are particularly at risk, especially those regions which have scored crosses and are folded particular severely or in several dimensions during production of the container.

SUMMARY

Generally, the object of present invention is to at least partly eliminate the disadvantages emerging from the prior art.

DETAILED DESCRIPTION

There is furthermore the object of providing a sheetlike composite which is distinguished by an improved impermeability to vapour and oxygen coupled with easy processability and high reliability, in particular without the formation of defects.

A further object is to provide a composite which has a sealing window which is as large as possible.

A further object is to provide a sheetlike composite which is suitable in particular for the production of containers for transportation and storage of milk, milk products, drinks containing vitamin C and other drinks, foodstuffs, drinks of low carbonic acid content or animal feed products and the like.

A contribution towards achieving at least one of the abovementioned objects is made by the subject matter of the category building claims. The subject matter of the subclaims which are dependent upon the category building claims represents preferred embodiments of this contribution towards achieving the objects.

A contribution towards achieving at least one of the above objects is made by a sheetlike composite comprising a layer configuration with the following layers, preferably in the sequence shown:
- o. optionally or necessarily a layer of thermoplastic KSu;
- i. a carrier layer;
- ii. a first layer of thermoplastic KSv;
- iii. a barrier layer;
- iv. a second layer of thermoplastic KSa;
- v. a third layer of thermoplastic KSw;
- wherein the Vicat softening temperature of the layer of thermoplastic KSv and the Vicat softening temperature of the layer of thermoplastic KSa is in each case higher than the Vicat softening temperature of the layer of thermoplastic KSw.

The term "joined" used in this description includes the adhesion of two objects beyond van der Waals forces of attraction. These objects can either follow one another directly or be joined to one another via further objects. For the sheetlike composite, this means, for example, that the carrier layer can be joined directly and therefore immediately to the layer of thermoplastic KSv, or also indirectly via an adhesion promoter layer, a direct joining being preferred.

The wording "comprising a layer configuration with layers, preferably in the sequence shown" as used above means that at least the stated layers are present in the composite according to the invention in the sequence shown. This wording does not necessarily mean that these layers follow one another directly. Rather, this wording includes constellations in which one or more additional layers can moreover be present between two layers mentioned successively in the above sequence. In addition to the abovementioned layer configuration, one or more further layers can likewise be present as a part of the composite. Thus, for example, at least one further layer of thermoplastic KSu can be provided on the side of the carrier layer directed towards the environment. The layer of thermoplastic KSu can also be joined here indirectly or directly to the carrier layer, direct joining being preferred. Furthermore, for example, a further layer or several further layers may additionally be provided over the complete or a part of the area on the side of the layer of thermoplastic KSu facing the environment. In particular, a printed layer may also be applied on the side of the layer of thermoplastic KSu facing the environment. However, possible further layers are also covering or protective layers. According to another embodiment, it is also possible for a printed layer to be provided between the carrier layer and the layer of thermoplastic KSu. In this case, the layer of thermoplastic KSu itself could also be a covering or protective layer for the printed layer.

If the sheetlike composite comprises at least one further layer of thermoplastic KSu, this conventionally has a weight per unit area in a range of from 5 to 50 g/m², particularly preferably in a range of from 8 to 40 g/m² and most preferably in a range of from 10 to 30 g/m². Preferably, the layer of thermoplastic KSu comprises a thermoplastic polymer to the extent of at least 70 wt. %, preferably at least 80 wt. % and particularly preferably at least 95 wt. %, in each case based on the layer of thermoplastic KSu. Possible suitable thermoplastics of the layer of thermoplastic KSu are in particular those which can be easily processed due to good extrusion properties. Among these, polymers obtained by chain polymerization are suitable, in particular polyesters or polyolefins, cyclic olefin copolymers (COC), polycyclic olefin copolymers (POC), in particular polyethylene and polypropylene, being particularly preferred and polyethylene being very particularly preferred. Mixtures of at least two thermoplastics can also be employed for the layer of thermoplastic KSu.

Among the polyethylenes, HDPE, MDPE, LDPE, LLDPE, VLDPE and PE and mixtures of at least two of these are preferred according to the present invention. Suitable polyethylenes have a melt flow rate (MFR) in a range of from 1 to 25 g/10 min, preferably in a range of from 2 to 20 g/10 min and particularly preferably in a range of from 2.5 to 15 g/10 min, and a density in a range of from 0.890 g/cm³ to 0.980 g/cm³, preferably in a range of from 0.895 g/cm³ to 0.975 g/cm³, and further preferably in a range of from 0.900 g/cm³ to 0.970 g/cm³. The at least one thermoplastic polymer contained in the layer of thermoplastic KSu, preferably all the polymers contained in the layer of thermoplastic KSu, preferably has a melting temperature in a range of from 80 to 155° C., preferably in a range of from 90 to 145° C. and particularly preferably in a range of from 95 to 135° C.

As the carrier layer, any material which is suitable for this purpose to the person skilled in the art and which has an adequate strength and rigidity to give the container stability to the extent that in the filled state the container essentially retains its shape can be employed. In addition to a number of plastics, plant-based fibrous substances, in particular pulps, preferably sized, bleached and/or non-bleached pulps are preferred, paper and cardboard being particularly preferred. The weight per unit area of the carrier layer is preferably in a range of from 120 to 450 g/m², particularly preferably in a range of from 130 to 400 g/m² and most preferably in a range of from 140 to 380 g/m². A suitable cardboard as a rule has a single- or multilayer configuration and can be coated on one or both sides with one or also more covering layers. A suitable cardboard furthermore has a residual moisture content of less than 20 wt. %, preferably from 2 to 15 wt. % and particularly preferably from 4 to 10 wt. %.

The plastics which have already been described above for the layer of thermoplastic KSu can preferably be employed, in particular, as the layer of thermoplastic KSv which preferably has a weight per unit area in a range of from 5 to 40 g/m², particularly preferably from 8 to 30 g/m² and moreover preferably from 10 to 25 g/m². Furthermore, the Vicat softening temperature of the layer of thermoplastic KSv is in a range of from 90° C. to 150° C., preferably from 95° C. to 140° C. and particularly preferably from 100° C. to 135° C.

In a preferred embodiment example, the layer of thermoplastic KSv is present as a mixture of at least two thermoplastics. In this connection, it is furthermore preferable for the layer of plastic KSv to comprise at least 25 wt. %, particularly preferably at least 35 wt. % and most preferably at least 45 wt. %, in each case based on the layer of plastic KSv, of a thermoplastic which has a Vicat softening temperature of at least 90° C., preferably at least 95° C. and particularly preferably at least 100° C. This thermoplastic furthermore preferably has a melting point of at least 110° C., preferably at least 115° C. and particularly preferably at least 120° C. This thermoplastic moreover preferably has a density of at least 0.918 g/cm³, preferably at least 0.922 g/cm³, particularly preferably at least 0.925 g/cm³ and moreover preferably at least 0.930 g/cm³.

In a particular embodiment of the abovementioned embodiment example, the layer of plastic KSv is present as a mixture of a polyolefin prepared by means of a metallocene catalyst and a further polymer, the further polymer preferably being a polyolefin which has not been prepared by means of a metallocene catalyst, preferably a polyethylene which has not been prepared by means of a metallocene catalyst (mPE). Particularly preferably, the layer of thermoplastic KSv is present as a mixture of 25 to 95 wt. %, preferably 35 to 85 wt. % and particularly preferably 45 to 75 wt. % of mPE and 5 to 75 wt. %, preferably 15 to 65 wt. % and particularly preferably 25 to 55 wt. % of PE, the mPE described here fulfilling at least one, preferably at least two and particularly preferably all of the parameters of Vicat softening temperature, melting temperature, MFR value and density mentioned above for the layer of thermoplastic KSv.

As the barrier layer, any material which is suitable for this purpose to the person skilled in the art and has an adequate barrier action, in particular against oxygen, can be employed. The barrier layer is preferably chosen from
  a. a barrier layer of plastic;
  b. a metal layer;
  c. a metal oxide layer; or
  d. a combination of at least two of a. to c.

If the barrier layer is a barrier layer of plastic according to alternative a., this preferably comprises at least 70 wt. %, particularly preferably at least 80 wt. % and most preferably at least 95 wt. % of at least one plastic which is known to the person skilled in the art for this purpose, in particular because of aroma or gas barrier properties which are suitable for packaging containers. Possible plastics, in particular thermoplastics, here are plastics carrying N or O, both by themselves and in mixtures of two or more. According to the invention, it may prove advantageous if the barrier layer of plastic has a melting temperature in a range of from more than 155 to 300° C., preferably in a range of from 160 to 280° C. and particularly preferably in a range of from 170 to 270° C.

Further preferably, the barrier layer of plastic has a weight per unit area in a range of from 2 to 120 g/m², preferably in a range of from 3 to 60 g/m², particularly preferably in a range of from 4 to 40 g/m² and moreover preferably from 6 to 30 g/m². Furthermore preferably, the barrier layer of plastic is obtainable from melts, for example by extrusion, in particular layer extrusion. Moreover preferably, the barrier layer of plastic can also be introduced into the sheetlike composite via lamination. It is preferable here for a film to be incorporated into the sheetlike composite. According to another embodiment, barrier layers of plastic which are obtainable by deposition from a solution or dispersion of plastics can also be chosen.

Possible suitable polymers are preferably those which have a weight-average molecular weight, determined by gel permeation chromatography (GPC) by means of light scattering, in a range of from $3 \times 10^3$ to $1 \times 10^7$ g/mol, preferably in a range of from $5 \times 10^3$ to $1 \times 10^6$ g/mol and particularly preferably in a range of from $6 \times 10^3$ to $1 \times 10^5$ g/mol. Possible suitable polymers are, in particular, polyamide (PA) or polyethylene/vinyl alcohol (EVOH) or a mixture thereof.

Among the polyamides, all PAs which seem suitable for the use according to the invention to the person skilled in the art are possible. PA 6, PA 6.6, PA 6.10, PA 6.12, PA 11 or PA 12 or a mixture of at least two of these are to be mentioned in particular, PA 6 and PA 6.6 being particularly preferred and PA 6 furthermore being preferred. PA 6 is commercially obtainable, for example, under the trade names Akulon®, Durethan® and Ultramid®. Amorphous polyamides, such as e.g. MXD6, Grivory® and Selar® PA, are moreover suitable. It is further preferable for the PA to have a density in a range of from 1.01 to 1.40 g/cm³, preferably in a range of from 1.05 to 1.30 g/cm³ and particularly preferably in a range of from 1.08 to 1.25 g/cm³. Furthermore, it is preferable for the PA to have a viscosity number in a range of from 130 to 185 ml/g and preferably in a range of from 140 to 180 ml/g.

As EVOH, all EVOHs which seem suitable for the use according to the invention to the person skilled in the art are possible. Examples of these are, inter alia, commercially obtainable in a large number of different configurations under the trade name EVAL™ from EVAL Europe NV, Belgium, for example the types EVAL™ F104B or EVAL™ LR171B. Preferred EVOHs have at least one, two, several or all of the following properties:
- an ethylene content in a range of from 20 to 60 mol %, preferably from 25 to 45 mol %;
- a density in a range of from 1.0 to 1.4 g/cm³, preferably from 1.1 to 1.3 g/cm³;
- a melting point in a range of from more than 155 to 235° C., preferably from 165 to 225° C.;
- an MFR value (210° C./2.16 kg if $T_{M(EVOH)}$<230° C.; 230° C./2.16 kg if 210° C.<$T_{M(EVOH)}$<230° C.) in a range of from 1 to 25 g/10 min, preferably from 2 to 20 g/10 min;
- an oxygen permeation rate in a range of from 0.05 to 3.2 cm³·20 μm/m²·day·atm, preferably in a range of from 0.1 to 1 cm³·20 μm/m²·day·atm.

According to alternative b. the barrier layer is a metal layer. All layers with metals which are known to the person skilled in the art and can provide a high impermeability to light and oxygen are suitable in principle as the metal layer. According to a preferred embodiment, the metal layer can be present as a foil or as a deposited layer, e.g. formed by a physical gas phase deposition. The metal layer is preferably an uninterrupted layer. According to a further preferred embodiment, the metal layer has a thickness in a range of from 3 to 20 μm, preferably a range of from 3.5 to 12 μm and particularly preferably in a range of from 4 to 10 μm.

Metals which are preferably chosen are aluminium, iron or copper. A steel layer, e.g. in the form of a foil, may be preferred as an iron layer. Furthermore preferably, the metal layer is a layer with aluminium. The aluminium layer can expediently be made of an aluminium alloy, such as, for example, AlFeMn, AlFe1.5Mn, AlFeSi or AlFeSiMn. The purity is conventionally 97.5% and higher, preferably 98.5% and higher, in each case based on the total aluminium layer. In a particular embodiment, the metal layer is made of an aluminium foil. Suitable aluminium foils have an extensibility of more than 1%, preferably of more than 1.3% and particularly preferably of more than 1.5%, and a tensile strength of more than 30 N/mm², preferably more than 40 N/mm² and particularly preferably more than 50 N/mm². Suitable alloys for establishing aluminium layers or foils are commercially obtainable under the designations EN AW 1200, EN AW 8079 or EN AW 8111 from Hydro Aluminium Deutschland GmbH or Amcor Flexibles Singen GmbH.

In the case of a metal foil as the barrier layer, an adhesion promoter can be provided between the metal foil and the next layer of thermoplastic on one and/or both sides of the metal foil. According to a particular embodiment of the container according to the invention, however, an adhesion promoter is provided between the metal foil and the next layer of thermoplastic on no side of the metal foil.

Furthermore preferably, a metal oxide layer can be chosen as the barrier layer according to alternative c. Possible metal oxide layers are all metal oxide layers which are familiar and seem suitable to the person skilled in the art for achieving a barrier action against light, vapour and/or gas. Metal oxide layers based on the metals aluminium, iron or copper already mentioned above and those metal oxide layers based on titanium or silicon oxide compounds are preferred in particular. A metal oxide layer is produced, by way of example, by vapour deposition of a metal oxide on a layer of plastic, for example an orientated polypropylene film. A preferred process for this is physical gas phase deposition.

According to a further preferred embodiment, the metal layer or the metal oxide layer can be present as a layer composite of one or more layers of plastic with a metal layer. Such a layer is obtainable, for example, by vapour deposition of a metal on a layer of plastic, for example an orientated polypropylene film. A preferred process for this is physical gas phase deposition.

According to a further preferred embodiment of the composite according to the invention, the sheetlike composite according to the invention contains at least the layers of thermoplastic KSv, KSa and KSw, where the layer of thermoplastic KSa follows the barrier layer, and preferably follows indirectly. The layer of thermoplastic KSw preferably follows the layer of plastic KSa, and particularly preferably follows directly.

The layer of thermoplastic KSa preferably has a weight per unit area in a range of from 5 to 50 g/m², particularly preferably from 8 to 40 g/m² and moreover preferably from 10 to 30 g/m². The plastics which have already been described above for the layer of thermoplastic KSu, in particular, can in turn preferably be employed. Furthermore, the Vicat softening temperature of the layer of thermoplastic KSa is in a range of from 90° C. to 150° C., preferably from 95° C. to 140° C. and particularly preferably from 100° C. to 135° C.

In a preferred embodiment example, the layer of thermoplastic KSa is present as a mixture of at least two thermoplastics. In this connection, it is furthermore preferable for the layer of thermoplastic KSa to comprise at least 25 wt. %, particularly preferably at least 35 wt. % and most preferably at least 45 wt. %, in each case based on the layer of thermoplastic KSa, of a thermoplastic which has a Vicat softening temperature of at least 90° C., preferably at least 95° C. and particularly preferably at least 100° C. This thermoplastic furthermore preferably has a melting point of at least 110° C., preferably at least 115° C. and particularly preferably at least 120° C. This thermoplastic moreover preferably has a density of at least 0.918 g/cm³, preferably at least 0.922 g/cm³, particularly preferably at least 0.925 g/cm³ and moreover preferably at least 0.930 g/cm³.

In a particular embodiment of the abovementioned embodiment example, the layer of thermoplastic KSa is present as a mixture of a polyolefin prepared by means of a metallocene catalyst and a further polymer, the further polymer preferably being a polyolefin which has not been prepared by means of a metallocene catalyst, preferably a polyethylene which has not been prepared by means of a metallocene catalyst. Particularly preferably, the layer of thermoplastic KSa is present as a mixture of 25 to 95 wt. %, preferably 35 to 85 wt. % and particularly preferably 45 to 75 wt. % of mPE and 5 to 75 wt. %, preferably 15 to 65 wt. % and particularly preferably 25 to 55 wt. % of PE, the mPE described here fulfilling at least one, preferably at least two and particularly preferably all of the parameters of Vicat softening temperature, melting temperature, MFR value and density mentioned above for the layer of thermoplastic KSv.

Plastics which have already been described for the layers of thermoplastic KSu, KSv or KSa, in particular, can preferably be employed for the layer of thermoplastic KSw, which preferably has a weight per unit area in a range of from 2 to 60 g/m$^2$, particularly preferably from 5 to 50 g/m$^2$ and moreover preferably from 7 to 40 g/m$^2$. Further preferably, the layer of thermoplastic KSw occurs as a mixture of at least two thermoplastics.

According to a preferred embodiment, the layer of thermoplastic KSw is based on a mixture of at least two polymers, one polymer preferably having a density in a range of from 0.910 to 0.930 g/cm$^3$, preferably from 0.915 to 0.925 g/cm$^3$. Furthermore preferably, this polymer has a melting temperature in a range of from 100° C. to 115° C. A second polymer preferably has a density in a range of from 0.880 to 0.915 g/cm$^3$, preferably 0.890 to 0.910 g/cm$^3$ and particularly preferably additionally a melting temperature in a range of from 90° C. to 115° C. The layer KSw has a Vicat softening temperature in a range of from 60 to 105° C., preferably from 65 to 100° C. and particularly preferably from 70 to 95° C.

In a particular embodiment of the abovementioned embodiment example, the layer of plastic KSw is present as a mixture of a polyolefin prepared by means of a metallocene catalyst and a further polymer, the further polymer preferably being a polyolefin which has not been prepared by means of a metallocene catalyst, preferably a polyethylene which has not been prepared by means of a metallocene catalyst. Particularly preferably, the layer of plastic KSw is present as a mixture of 65 to 95 wt. %, preferably 70 to 90 wt. % and particularly preferably 75 to 85 wt. % of mPE and 5 to 35 wt. %, preferably 10 to 30 wt. % and particularly preferably 15 to 25 wt. % of PE. In a further embodiment example, the layer of thermoplastic KSw is present as a mixture of 15 to 45 wt. %, preferably 20 to 40 wt. % and particularly preferably 25 to 35 wt. % of mPE and 55 to 85 wt. %, preferably 60 to 80 wt. % and particularly preferably 65 to 75 wt. % of PE.

According to a further preferred embodiment variant, one or more or all of the layers of thermoplastic of the composite KSv, KSa, KSw and optionally KSu can also comprise an inorganic solid as a filler, in addition to a thermoplastic polymer. In this connection, it is preferable for the particular layer of thermoplastic to comprise a thermoplastic polymer or polymer mixture to the extent of at least 60 wt. %, preferably at least 80 wt. % and particularly preferably at least 95 wt. %, in each case based on the corresponding layer of thermoplastic. All solids which seem suitable to the person skilled in the art are possible as the inorganic solid, preferably particulate solids, preferably metal salts or oxides of di- to tetravalent metals. Examples which may be mentioned here are the sulphates or carbonates of calcium, barium or magnesium or titanium dioxide, preferably calcium carbonate. The average particle sizes (d50%) of the inorganic solids, determined by sieve analysis, are preferably in a range of from 0.1 to 10 µm, preferably in a range of from 0.5 to 5 µm and particularly preferably in a range of from 1 to 3 µm.

According to a further preferred embodiment, at least one, preferably at least two and furthermore preferably at least three of the layers of thermoplastic KSv, KSa, KSw or optionally KSu is a plastics mixture of at least two plastics.

Preferably, at least one of the layers of thermoplastic KSv, KSa, KSw or optionally KSu contains at least one polyolefin with a mass density in a range of from 0.918 g/cm$^3$ to 0.980 g/cm$^3$, preferably from 0.922 to 0.970 g/cm$^3$, particularly preferably from 0.925 to 0.965 g/cm$^3$ and moreover preferably from 0.930 to 0.960 g/cm$^3$ in a range of from 20 wt. % to 100 wt. %, preferably from 45 to 95 wt. % and particularly preferably from 65 to 85 wt. %, in each case based on the total weight of the layer of plastic. Particularly preferably, one of the layers of thermoplastic KSv and KSa has, in particular, the abovementioned mass density. According to a further preferred embodiment, both layers of thermoplastic KSv and KSa have a mass density in the abovementioned range. Particularly preferably, the mass density of the layer of thermoplastic KSw does not lie in the range mentioned. According to a further preferred embodiment, the layers of thermoplastic KSv, KSa, KSw and optionally KSu each have a melting temperature in the range of from 80 to 155° C.

According to the invention, the Vicat softening temperature of the layer of thermoplastic KSv and the Vicat softening temperature of the layer of thermoplastic KSa is in each case higher, particularly preferably by in each case at least 4 K, at least 6 K, at least 8 K, at least 10 K, at least 12 K, at least 14 K, at least 16 K or at least 18 K higher than the Vicat softening temperature of the layer of thermoplastic KSw. Maximum differences in the Vicat softening temperatures of 60 K are often observed.

Further preferably, the Vicat softening temperature of the at least one layer of thermoplastic KSv and of the at least one layer of thermoplastic KSa is in each case in a range of from 90 to 150° C., or from 95 to 140° C. or from 100 to 135° C. The Vicat softening temperature of the at least one layer of thermoplastic KSw is preferably in a range of from 60° C. to 105° C., or from 65° C. to 100° C. or from 70° C. to 95° C.

According to a further preferred embodiment, the melting temperature of the layer of thermoplastic KSv and the melting temperature of the layer of thermoplastic KSa is in each case higher, particularly preferably by in each case at least 3 K, or 4 K, at least 6 K, at least 8 K, at least 10 K, at least 12 K, at least 14 K, at least 16 K or at least 18 K higher than the melting temperature of the layer of thermoplastic KSw. Further preferably, the melting temperature of the layer of thermoplastic KSv and of the layer of thermoplastic KSa is in each case in a range of from 100 to 150° C., or from 105 to 140° C. The melting temperature of the layer of thermoplastic KSw is preferably in a range of from 80° C. to 125° C., or from 85° C. to 120° C., or from 90° C. to 115° C.

According to a further preferred embodiment, the modulus of the difference between the Vicat softening temperature of the layer of thermoplastic KSv and the Vicat softening temperature of the layer of thermoplastic KSa is in a range of from 0 to 10 K, or in a range of from 0 to 5 K, or in a range of from 0 to 3 K or in a range of from 0.1 to 1.8 K.

According to a further preferred embodiment, the modulus of the difference between the melting temperature of the layer of thermoplastic KSv and the melting temperature of the layer of thermoplastic KSa is in a range of from 0 to 10

K, or in a range of from 0 to 5 K, or in a range of from 0 to 3 K or in a range of from 0.1 to 1.8 K.

Possible adhesion promoters in the adhesion promoter layer are all plastics which, due to functionalization by means of suitable functional groups, are suitable for generating a firm join by the formation of ionic bonds or covalent bonds to the surface of the other particular layer. Preferably, these are functionalized polyolefins which have been obtained by copolymerization of ethylene with acrylic acids, such as acrylic acid, methacrylic acid, crotonic acid, acrylates, acrylate derivatives or carboxylic acid anhydrides carrying double bonds, for example maleic anhydride, or at least two of these. Among these, polyethylene-maleic anhydride graft polymers (EMAH), ethylene/acrylic acid copolymers (EAA) or ethylene/methacrylic acid copolymers (EMAA), which are marketed, for example, under the trade names Bynel® and Nucrel® 0609HSA by DuPont or Escor® 6000ExCo by ExxonMobile Chemicals, are preferred.

In one embodiment of the process according to the invention, it is preferable, for further improvement in the adhesion of two adjacent layers to one another, for these to be subjected to a surface treatment, for example, during the coating. Suitable processes for the surface treatment are a flame treatment, a treatment with plasma, a corona treatment or a treatment with ozone known, inter alia, to the person skilled in the art. However, other processes which have the effect of formation of functional groups on the surface of the treated layer are also conceivable. In a particular embodiment, at least one of these processes is used in the lamination of metal layers, in particular of metal foils.

In order to facilitate the ease of opening of the container according to the invention, the carrier layer can have at least one hole. In a particular embodiment, the hole is covered at least with the barrier layer and at least one of the layers of thermoplastic KSa or KSw as hole-covering layers.

According to a further preferred embodiment, the carrier layer of composite has a hole which is covered at least with the layer of thermoplastic KSv, the barrier layer and the layers of thermoplastic KSa and KSW as hole-covering layers. It is particularly preferable for the hole additionally to be covered with the layer of thermoplastic KSu. It is particularly preferable for the hole additionally to be covered with the layer of thermoplastic KSu. One or more further layers, in particular adhesion promoter layers, can furthermore be provided between the layers already mentioned. It is preferable here for. The hole-covering layers to be joined to one another at least partly, preferably to the extent of at least 30%, preferably at least 70% and particularly preferably to the extent of at least 90% of the area formed by the hole. According to a particular embodiment, however, it may be that the hole penetrates through the entire composite and is covered by a closure or opening device which closes the hole.

In connection with a first preferred embodiment, the hole provided in the carrier layer can have any form which is known to the person skilled in the art and is suitable for various closures, drinking straws or opening aids.

The opening of such a container is usually generated by at least partial destruction of the hole-covering layers covering the hole. This destruction can be effected by cutting, pressing into the container or pulling out of the container. The destruction can be effected by an openable closure joined to the container and arranged in the region of the hole, usually above the hole, or a drinking straw which is pushed through the hole-covering layers covering the hole.

According to a further preferred embodiment, the carrier layer of the composite has a plurality of holes in the form of a perforation, the individual holes being covered at least with the barrier layer and one of the layers of thermoplastic KSa and KSw as hole-covering layers. A container produced from such a composite can then be opened by tearing along the perforation. Such holes for perforations are preferably generated by means of a laser. The use of laser beams is particularly preferred if a metal foil or a metallized foil is employed as the barrier layer. It is furthermore possible for the perforation to be introduced by mechanical perforation tools, usually having blades.

According to a further preferred embodiment, the sheetlike composite is subjected to a heat treatment at least in the region of the at least one hole. In the case of several holes present in the carrier layer in the form of a perforation, it is particularly preferable for this heat treatment also to be carried out around the edge region of the hole.

The heat treatment can be carried out by radiation, by hot gas, by thermal contact with a solid, by mechanical vibrations or by a combination of at least two of these measures. Particularly preferably, the heat treatment is carried out by irradiation, preferably electromagnetic radiation and particularly preferably electromagnetic induction or also by hot gas. The particular optimum operating parameters to be chosen are known to the person skilled in the art.

According to a further preferred embodiment, the plastics of the layers of thermoplastic of the sheetlike composite, in particular the layers of thermoplastic KSv and KSa, contain no comonomers which are known to the person skilled in the art to have the effect of an improvement in adhesion. Such copolymers are mentioned inter alia in the abovementioned adhesion promoter layers. In particular, the layers of thermoplastic KSv and KSa are therefore as a rule not suitable as adhesion promoters or as adhesive layers.

The present invention also provides a process for the production of the sheetlike composite described above. All the processes which are known to the person skilled in the art and seem suitable for the production of the composite according to the invention are possible for this.

According to preferred embodiment, the sheetlike composite according to the invention can be produced by a process which comprises, inter alia, the following process steps:

A. provision of a composite precursor comprising at least the carrier layer;
B. application of at least one layer of thermoplastic to one side of the composite precursor;
C. application of at least one further layer of thermoplastic to the opposite side of the composite precursor.

In process step A. of the process according to the invention, a composite precursor comprising at least the carrier layer is first produced. The composite precursor essentially includes the carrier layer, which can already have one or more holes and to which optionally at least one printed layer is applied. Preferably, however, this composite precursor is a non-printed carrier layer.

In step B. at least one layer of thermoplastic is applied to the composite precursor provided. The application of this at least one layer is preferably carried out by melt coating, preferably by extrusion coating. However, it is also conceivable for several layers, for example layers of thermoplastic, barrier layers and/or adhesion promoter layers, to be applied sequentially or simultaneously by coextrusion in step B.

In step C. at least one further layer of thermoplastic is then applied to the opposite side of the composite precursor. The application of this at least one further layer of thermoplastic is preferably carried out by melt coating, preferably by extrusion coating. However, it is also conceivable for several layers, for example layers of thermoplastic, barrier layers and/or adhesion promoter layers, to be applied sequentially or simultaneously by coextrusion in step C.

During application of the individual layers, in a preferred embodiment the at least one film or a multilayer composite film is provided in the form of a roll and is laminated on to the composite via further layers, preferably layers of thermoplastic or adhesion promoter layers. This is the case in particular during introduction of metal layers, in particular of metal foils.

If the sheetlike composite has one or more holes to facilitate ease of opening, these can be introduced into the sheetlike composite either before step A., after step B. or after step C.

In a preferred embodiment of the process, a non-printed carrier layer which already has holes is provided as the composite precursor in step A. In step B. the layer of thermoplastic KSu is then first applied to the composite precursor. In the further process step C. the layer of thermoplastic KSv, the barrier layer, the layer of thermoplastic KSa and the layer of thermoplastic KSw are then applied. In each case one or more adhesion promoter layers can also be co-applied here. In another embodiment, however, it is also conceivable that in step B. first the layer of thermoplastic KSv, the barrier layer, the layer of thermoplastic KSa and the layer of thermoplastic KSw are applied. In step C. the layer of thermoplastic KSu is then applied. Here also, in each case further layers, for example adhesion promoter layers, can be co-applied. The extrusion can be carried out in individual layers by a series of successive individual extruders or also in multiple layers by coextrusion, the abovementioned sequence of the individual layers always being retained. A combination of extrusion and lamination coating can also take place in the process according to the invention.

In connection with the sheetlike composite, but also in connection with the composite precursor, it is preferable for at least one of the two to have at least one or two and more scores along which edges are formed during production of the container. This facilitates the folding and the formation of a kink running along the line prepared by the score, in order to achieve in this way a fold which is as uniform and accurately positioned as possible. The scores can be introduced already before step A, after step B or also after step C, it being preferable for the scoring to be carried out after step C, that is to say after the coating of both sides of the carrier layer.

As a rule, the sheetlike composite is produced, usually as roll goods, by coextrusion of the individual layers of the sheetlike composite. The scores are provided on these roll goods. However, it is also possible for the scores to be produced in the carrier layer already before the coating.

According to a further preferred embodiment of the process according to the invention for the production of a sheetlike composite, it is preferable, especially if the carrier layer, as described above, includes a hole or several holes, for at least one of the layers of plastic KSv, KSa, KSw or optionally KSu to be stretched during the application, this stretching preferably being carried out by melt stretching, very particularly preferably by monoaxial melt stretching. For this, the layer is applied in the molten state to the composite precursor by means of a melt extruder and the layer applied, which is still in the molten state, is then stretched in preferably the monoaxial direction in order to achieve an orientation of the polymer in this direction. The layer applied is then allowed to cool for the purpose of thermofixing.

In this connection, it is particularly preferable for the stretching to be carried out by at least the following application steps:

b1. emergence of the at least one layer of thermoplastic as at least one melt film via at least one extruder die slot with an exit speed $V_{exit}$;

b2. application of the at least one melt film to the composite precursor moving relative to the at least one extruder die slot with a moving speed $V_{adv}$;

where $V_{exit} < V_{adv}$. It is particularly preferable for $V_{adv}$ to be greater than $V_{exit}$ by a factor in the range of from 5 to 200, particularly preferably in a range of from 7 to 150, moreover preferably in a range of from 10 to 50 and most preferably in a range of from 15 to 35. In this context, it is preferable for $V_{adv}$ to be at least 100 m/min, particularly preferably at least 200 m/min and very particularly preferably at least 350 m/min, but conventionally not to lie above 1,300 m/min.

After the melt layer has been applied to the composite precursor by means of the stretching process described above, the melt layer is allowed to cool for the purpose of thermofixing, this cooling preferably being carried out by quenching via contact with a surface which is kept at a temperature in a range of from 5 to 50° C., particularly preferably in a range of from 10 to 30° C.

As already described above, after the thermofixing it may prove to be particularly advantageous if the sheetlike composite is heat-treated at least in the region of the at least one hole, in order to effect there an at least partial elimination of the orientation of the polymer.

According to a further preferred embodiment, at least one, preferably two or even all of the layers of thermoplastic KSv, KSa, KSw or optionally KSu is produced by extrusion or coextrusion of at least one polymer P1 through a slot die to obtain an emerging surface, at least one polymer P2 which differs from polymer P1 being provided on the flanks of the surface of the at least one polymer P1 emerging from the slot die. Thermoplastic polymers are preferably chosen as the polymer P2. Preferred thermoplastic polymers have a high rate of branching, a wide molecular weight distribution, and in the case of extrusion coating, after exit from the die have a low tendency towards "neck-in" and "edge-waving" or film striking.

The preferred embodiments relating to the production of the sheetlike composite employing at least one or more up to even all of the layers of thermoplastic from thermoplastics which can be produced by extrusion or coextrusion have already been described above. The choice of thermoplastic to be employed depends on which of the layers of thermoplastic KSu, KSv, KSa or KSw is to be produced by extrusion or coextrusion. With respect to the suitable and preferred thermoplastics, reference is made to the description of the layers of plastic KSu, KSv, KSa and KSw. The thermoplastic chosen or the mixture of thermoplastics chosen then forms P1 of the particular layer of thermoplastic. During a coextrusion of different layers, the surface F is formed from several different thermoplastics or plastics mixtures P1.

With respect to an efficient use of materials, in a preferred embodiment the polymer P2 can likewise also be a constituent of the surface F. One or more thermoplastics, preferably polyethylenes, particularly preferably LDPE and moreover preferably LDPE prepared in an autoclave reactor, are particularly suitable as polymer P2. By way of example, suitable polymers are 23L430 or 19N430 from Ineos. It is also conceivable for a mixture of at least two suitable polymers to be employed as the edge layer P2.

The polymer P1 and the polymer P2 are preferably coextruded. They thus form intimately bonded regions of the emerging surface. There are essentially two variants here of how the polymer stream P2 can be fed to the extruder die. If the P2 is also a constituent of the film F, this can be branched off into a separate polymer stream in the feed block and passed to the edge region of the extruder die. Alternatively, an additional extruder which provides the P2 and leads it to the extruder die can also be provided.

During the extrusion, the thermoplastics are conventionally heated to temperatures of from 210 to 330° C., measured on the molten polymer film below the exit at the extruder die. The extrusion can be carried out by means of extrusion tools which are known to the person skilled in the art and commercially obtainable, such as, for example, extruders, extruder screws, feed block etc.

According to a further preferred embodiment, the area which has emerged is cooled to a temperature below the lowest melting temperature of the polymers P1 and P2 provided in this surface or its flanks, and at least the flanks of the surface are then separated off from this surface. Cooling can be carried out in any manner which is familiar to the person skilled in the art and seems to be suitable. The thermofixing already described above is also preferred here. At least the flanks are then separated off from the surface F. The separating off can be carried out in any manner which is familiar to the person skilled in the art and seems to be suitable. Preferably, the separating off is carried out by a knife, laser beam or water jet, or a combination of two or more of these, the use of knives, in particular knives for a shear cut, being particularly preferred.

The present invention also provides a container which surrounds an interior and comprises at least the sheetlike composite described above. The embodiments, and in particular the preferred embodiments, described in connection with the sheetlike composite according to the invention are also preferred for the container according to the invention.

The present invention also provides a process for the production of a container surrounding an interior, comprising the process steps, preferably in the sequence shown:
a. provision of a sheetlike composite comprising a layer configuration with the following layers:
   o. optionally a layer of thermoplastic KSu of a plastics composition KSum;
   i. a carrier layer;
   ii. a first layer of thermoplastic KSv of a plastics composition KSvm;
   iii. a barrier layer;
   iv. a second layer of thermoplastic KSa of a plastics composition KSam;
   v. a further layer of thermoplastic KSw of a plastics composition KSwm;
   wherein the Vicat softening temperature of the plastics composition KSvm and the Vicat softening temperature of the plastics composition KSam is in each case higher than the Vicat softening temperature of the plastics composition KSwm;
b. folding of the sheetlike composite to form a fold with at least two fold surfaces adjacent to one another, layer v. facing the interior of the container;
c. joining of in each case at least a part region of the at least two fold surfaces to form a container region.

The plastics compositions employed according to the invention can be made of a single thermoplastic or from two or more thermoplastics. The above statements therefore apply here accordingly to the thermoplastics and the layers of thermoplastic. Generally, the plastics compositions can be fed to an extruder in any form which is suitable for extruding to the person skilled in the art. Preferably, the plastics compositions are employed as powders or granules, preferably as granules.

The embodiments, and in particular the preferred embodiments, described in connection with the sheetlike composite according to the invention are also preferred in the process according to the invention for the production of the container surrounding an interior. It is particularly preferable for the Vicat softening temperature of the plastics composition KSvm and the Vicat softening temperature of the plastics composition KSam also in each case to be higher than the Vicat softening temperature of the plastics composition KSwm.

In the process according to the invention, it is furthermore preferable for the Vicat softening temperature of the plastics composition KSvm and the Vicat softening temperature of the plastics composition KSam in each case to be higher, particularly preferably by in each case at least 4 K, at least 6 K, at least 8 K, at least 10 K, at least 12 K, at least 14 K, at least 16 K or at least 18 K, than the Vicat softening temperature of the plastics composition KSwm.

The embodiments, and in particular the preferred embodiments, described in connection with the sheetlike composite according to the invention are also preferred in the process according to the invention for the production of the container surrounding an interior.

If the roll goods provided with scores are not employed directly in step a., container blanks for an individual container are obtained from the roll goods and are provided as the sheetlike composite in step a.

The container according to the invention can have a large number of different forms, but an essentially square-shaped structure is preferred. The container can furthermore be formed over its complete surface from the sheetlike composite, or can have a 2- or multi-part configuration. In the case of a multi-part configuration, it is conceivable that in addition to the sheetlike composite, other materials can also be employed, for example plastic material, which can be employed in particular in the top or the base regions of the container. However, it is preferable here for the container to be constructed from the sheetlike composite to the extent of at least 50%, particularly preferably to the extent of at least 70% and moreover preferably to the extent of at least 90% of the surface. Furthermore, the container can have a device for emptying the contents. This can be formed, for example, from plastic material and attached to the outside of the container. It is also conceivable that this device is integrated into the container by "direct injection moulding".

According to a preferred embodiment, the container according to the invention has at least one, preferably from 4 to 22 or also more edges, particularly preferably from 7 to 12 edges. In the context of the present invention, edge is understood as meaning regions which are formed on folding a surface. Edges which may be mentioned by way of example are the elongated contact regions of in each case two wall surfaces of the container. In the container, the container walls preferably represent the surfaces of the container framed by the edges.

In process step a. of the process according to the invention, a sheetlike composite obtained by the process described above for the production of a sheetlike composite is first provided, from which a container precursor is then formed by folding in process step b.

In one embodiment of the process according to the invention, in step b. the at least one, preferably at least two of the layers of thermoplastic KSv, KSa, KSw and optionally KSu, further preferably at least the layers of thermoplastic KSa and KSw, and particularly preferably each of the layers of thermoplastic KSv, KSa, KSw and optionally KSu, has a temperature above the melting temperature of the particular layer.

In another embodiment of the process according to the invention, in step b. the at least one, preferably at least two of the layers of thermoplastic KSv, KSa, KSw and optionally KSu, further preferably at least the layers of thermoplastic KSa and KSw, and particularly preferably each of the layers of thermoplastic KSv, KSa, KSw and optionally KSu, has a temperature below the melting temperature of the particular layer.

According to a further preferred embodiment of the process according to the invention, at least one, preferably at least two of the layers of thermoplastic KSv, KSa, KSw and optionally KSu, further preferably at least the layers of thermoplastic KSa and KSw, or also all of the layers of thermoplastic KSv, KSa, KSw and optionally KSu has or have a melting temperature below the melting temperature of the barrier layer.

The melting temperatures of the at least one, preferably of the at least two, further preferably at least the layers of thermoplastic KSa and KSw or also all of the layers of thermoplastic KSv, KSa, KSw and optionally KSu and the melting temperature of the barrier layer differ here preferably by at least 1 K, particularly preferably by at least 10 K, still more preferably by at least 50 K, moreover preferably at least 100 K. The temperature difference should preferably be chosen only so high that melting of the barrier layer, in particular melting of the barrier layer of plastic, does not occur during the folding.

In the process according to the invention, in a further embodiment a further folding follows step c. as step d., in the further folding at least one, preferably each of the layers of thermoplastic KSv, KSa, KSw and optionally KSu having a temperature which is below the melting temperature of this layer of thermoplastic.

According to the invention, in this context "folding" is understood as meaning an operation in which preferably an elongated kink forming an angle is generated in the folded sheetlike composite by means of a folding edge of a folding tool. For this, two adjacent surfaces of a sheetlike composite are often bent ever more towards one another. By the fold, at least two adjacent fold surfaces are formed, which can then be joined at least in part regions to form a container region. According to the invention, the joining can be effected by any measure which appears to be suitable to the person skilled in the art and which makes possible a join which is as gas- and liquid-tight as possible. The joining can be carried out by sealing or gluing or a combination of the two measures. In the case of sealing, the join is created by means of a liquid and solidification thereof. In the case of gluing, chemical bonds which create the join form between the interfaces or surfaces of the two objects to be joined. In the case of sealing or gluing, it is often advantageous for the surfaces to be sealed or glued to be pressed together with one another.

The sealing temperature is preferably chosen such that the thermoplastic or thermoplastics involved in the sealing, preferably the polymers of the layer of thermoplastic KSw and/or optionally of the layer of thermoplastic KSu, are present as a melt. The sealing temperatures are therefore at least 1 K, preferably at least 5 K and particularly preferably at least 10 K above the melting temperature of the particular plastic. Furthermore, the sealing temperature chosen should not be too high, in order that the exposure of the plastic or plastics to heat is not unnecessarily severe, so that they do not lose their envisaged material properties.

In a further preferred embodiment of the process according to the invention, it is envisaged that the container is filled with a foodstuff before step b. or after step c. All the foodstuffs known to the person skilled in the art for human consumption and also animal feeds are possible as the foodstuff. Preferred foodstuffs are liquid above 5° C., for example dairy products, soups, sauces and non-carbonated drinks. The filling can be carried out in various ways. On the one hand, the foodstuff and the container can be sterilized separately, before the filling, to the greatest degree possible by suitable measures such as treatment of the container with $H_2O_2$, UV radiation or other suitable high-energy radiation, plasma treatment or a combination of at least two of these, as well as heating of the foodstuff, and the container is then filled. This type of filling is often called "aseptic filling" and is preferred according to the invention. In addition to or also instead of the aseptic filling, it is furthermore a widespread procedure to heat the container filled with foodstuff to reduce the germ count. This is preferably carried out by pasteurization or autoclaving. Less sterile foodstuffs and containers can also be employed in this procedure.

In the embodiment of the process according to the invention in which the container is filled with foodstuff before step b., it is preferable for a tubular structure with a fixed longitudinal seam first to be formed from the sheetlike composite by sealing or gluing the overlapping borders. This tubular structure is compressed laterally, fixed and separated and formed into an open container by folding and sealing or gluing. The foodstuff here can already be filled into the container before the fixing and before the separation and folding of the base in the sense of step b.

In the embodiment of the process according to the invention in which the container is filled with foodstuff after step c., it is preferable for a container which is obtained by shaping the sheetlike composite and is opened on one side to be employed. Shaping of the sheetlike composite and obtaining of such an opened container can be carried out by steps b. and c. by any procedure which appears to be suitable for this to the person skilled in the art. In particular, shaping can be carried out by a procedure in which sheet-like container blanks which already take into account the shape of the container in their cut-out are folded such that an opened container precursor is formed. This is as a rule effected by a procedure in which after folding of this container blank, its longitudinal edges are sealed or glued to form a side wall and the one side of the container precursor is closed by folding and further fixing, in particular sealing or gluing.

In a further embodiment of the process according to the invention, it is preferable for the fold surfaces to form an angle μ of less than 90°, preferably of less than 45° and particularly preferably of less than 20°. The fold surfaces are often folded to the extent that these come to lie on one another at the end of the folding. This is advantageous in particular if the fold surfaces lying on one another are subsequently joined to one another in order to form the container base and the container top, which is often configured gable-like or also flat. Regarding the gable configuration, reference may be made by way of example to WO 90/09926 A2.

Furthermore, in one embodiment of the process according to the invention, at least the layer of thermoplastic KSw or optionally the layer of thermoplastic KSu or also both, is or are heated above the melting temperature of the layers of thermoplastic before step c. Preferably, before step c., particularly preferably directly before step c., heating is carried out to temperatures which are at least 1 K, preferably at least 5 K and particularly preferably at least 10 K above the melting temperature of these layers. The temperature should as far as possible be above the melting temperature of the particular plastic to the extent that by the cooling, due to the folding, moving and pressing, the plastic does not cool to the extent that this becomes solid again.

Preferably, the heating to these temperatures is carried out by irradiation, by mechanical vibrations, by contact with a hot solid or hot gas, preferably hot air, or a combination of these measures. In the case of irradiation, any type of radiation which is suitable for softening the plastics to the person skilled in the art is possible. Preferred types of radiation are IR rays, UV rays, microwaves or also electromagnetic radiation, in particular electromagnetic induction. Preferred types of vibration are ultrasound.

In the process according to the invention, it is furthermore preferable for the maximum transmission intensity of at least one of the perforated covering layers comprising a stretched polymer to differ before and after the heat treatment. This can conventionally be ascertained by different representations of the region viewed through a polarization filter. The heat-treated regions thus differ by light-dark contrasts from the regions on a surface which are adjacent to these but have not been heat-treated. Moreover, a difference in gloss is generally to be detected due to the change in structure of the polymer inner layer originating from the heat treatment, compared with the regions which have not been heat-treated. The same applies to regions before and after the heat treatment.

In addition to the perforated covering layers, further regions of the sheetlike composite can also be heat-treated. These also show a different maximum transmission intensity compared with the non-treated regions. These include all regions in which joining by sealing is carried out and/or scores for folding are provided. Among these regions, the longitudinal seams at which the sheetlike composite is formed into a tubular or jacket-like structure are particularly preferred. After the above heat treatment, the heat-treated regions can be allowed to cool again.

According to the above embodiments, the invention also provides the use of the sheetlike composite according to the invention or of a container produced therefrom or comprising this composite for storage of foodstuffs, in particular of sterilized foodstuffs.

Test Methods:

Unless specified otherwise herein, the parameters mentioned herein are measured by means of ISO specifications. These are, for determination of the MFR value: ISO 1133 (unless otherwise stated, at 190° C. and 2.16 kg);

the density: ISO 1183-1;

the melting temperature with the aid of the DSC method: ISO 11357-1, -5; if the sample is based on a mixture of several plastics and the determination of the melting temperature by the abovementioned method gives several peak temperatures $T_p$, the highest of the peak temperatures $T_{p,m}$ which is to be assigned to a plastic of the plastics mixture is defined as the melting temperature. The equipment is calibrated according to the manufacturer's instructions with the aid of the following measurements:

indium onset temperature heat of melting of indium zinc onset temperature the molecular weight distribution by gel permeation chromatography by means of light scattering: ISO 16014-3/-5;

the viscosity number of PA: ISO 307 in 95% sulphuric acid;

the oxygen permeation rate: ISO 14663-2 annex C at 20° C. and 65% relative atmospheric humidity;

the Vicat softening temperature: ISO 306:2004, method VST-A50 (load=10 N, increase in temperature=50 K/h) using an oil heating bath;

the moisture content of the cardboard: ISO 287:2009;

the extensibility or tensile strength of the aluminium foil: ISO 546-1;

For determination of the adhesion of two adjacent layers, these are fixed on a rotatable roll on a 90° peel test apparatus, for example from Instron "German rotating wheel fixture", which rotates at 40 mm/min during the measurement. The samples were cut to size in 15 mm wide strips beforehand. On one side of the sample the layers are detached from one another and the detached end is clamped in a tensioning device directed perpendicularly upwards. A measuring apparatus for determining the tensile force is attached to the tensioning device. On rotation of the roll, the force necessary to separate the layers from one another is measured. This force corresponds to the adhesion of the layers to one another and is stated in N/15 mm. The separation of the individual layers can be carried out, for example, mechanically, or by a targeted pretreatment, for example by softening the sample for 3 min in 60° C. hot 30% acetic acid.

For determination of the Vicat softening temperature on individual layers of the composite, the layer to be investigated is separated from the remaining layers by mechanical or chemical means. It is essential to ensure here that no contamination of the samples by adjacent layers occurs. From the sample material collected in this way, a test specimen can be established according to the dimensions stated in ISO 306:2004 and the Vicat softening temperature can be determined in accordance with the standard mentioned. If the material of plastic to be investigated is present as flocks or crumbs, these are processed to give a homogeneous test specimen. This can be carried out by pressing, careful heating or both measures.

EXAMPLE

The sheetlike composites were produced with the aid of the coating process described above by process steps A-C. A carrier layer which optionally has holes for closures or drinking straws is first taken. This is first coated according to process step A with the layer of plastic KSu, and in process step C first the layer of plastic KSv, the adhesion promoter layer and then the barrier layer, followed by an adhesion promoter layer of the layer of plastic KSa and finally the layer of plastic KSw are then applied to the side of the carrier layer facing away from the layer of plastic KSu. This is as a rule carried out in a commercially available coating installation.

| Layer | Weight per unit area or film thickness | |
|---|---|---|
| KSu | 20 g/m² | 100 wt. % (4) |
| Carrier layer | 220 g/m² | (2) |
| KSv | 18 g/m² | 70 wt. % (5)/30 wt. % (4) |
| Adhesion promoter | 3 g/m² | 100 wt. % (8) |
| Barrier layer | 6 μm | (1) |
| Adhesion promoter | 4 g/m² | 100 wt. % (7) |
| KSa | 22 g/m² | 70 wt. % (5)/30 wt. % (4) |
| KSw | 10 g/m² | 70 wt. % (3)/30 wt. % (6) |

(1) Aluminium foil, EN AW 8079, tensile strength: 75 N/mm², extensibility: 1.7% from Hydro Aluminium Deutschland GmbH
(2) Cardboard, Stora Enso Natura
(3) 19N430 from Ineos
(4) 23L430 from Ineos
(5) Lumicene ® mPE M 4040 from Total Petrochemicals
(6) Affinity ® PT 1451G1 from Dow Chemicals
(7) Escor 6000 HSC ExxonMobile
(8) Novex M21N430 from Ineos

FIGURES

Figure 2:
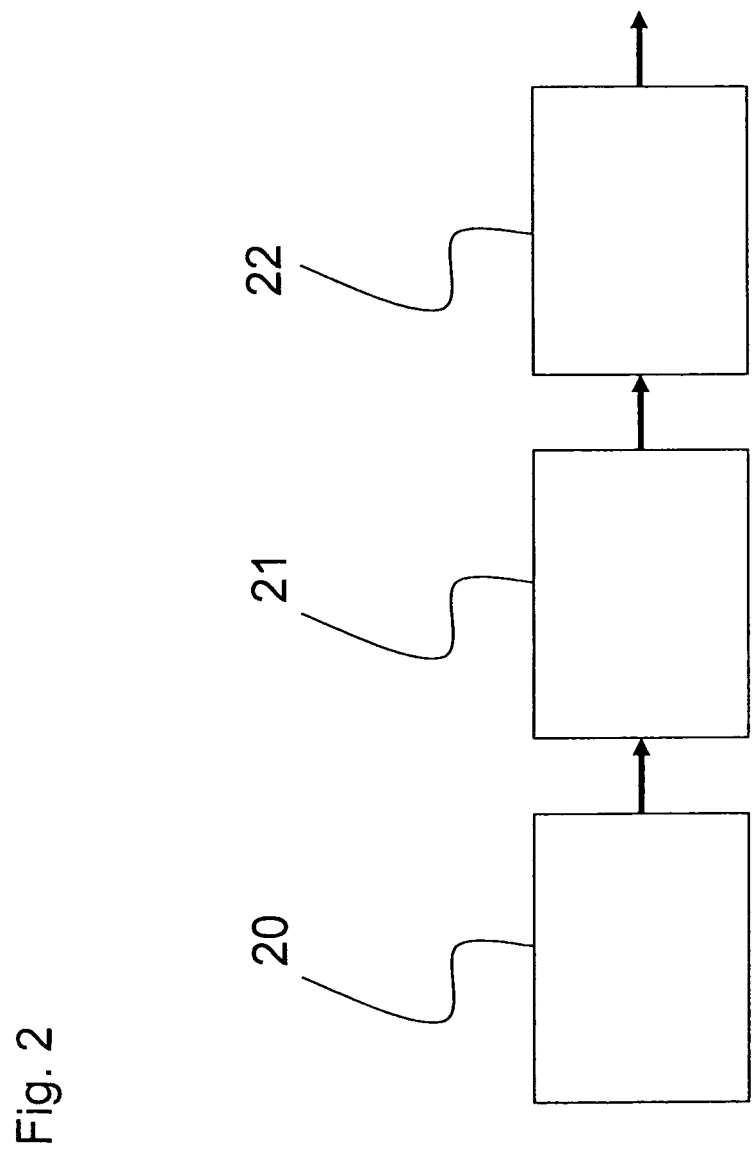
Figure 6:
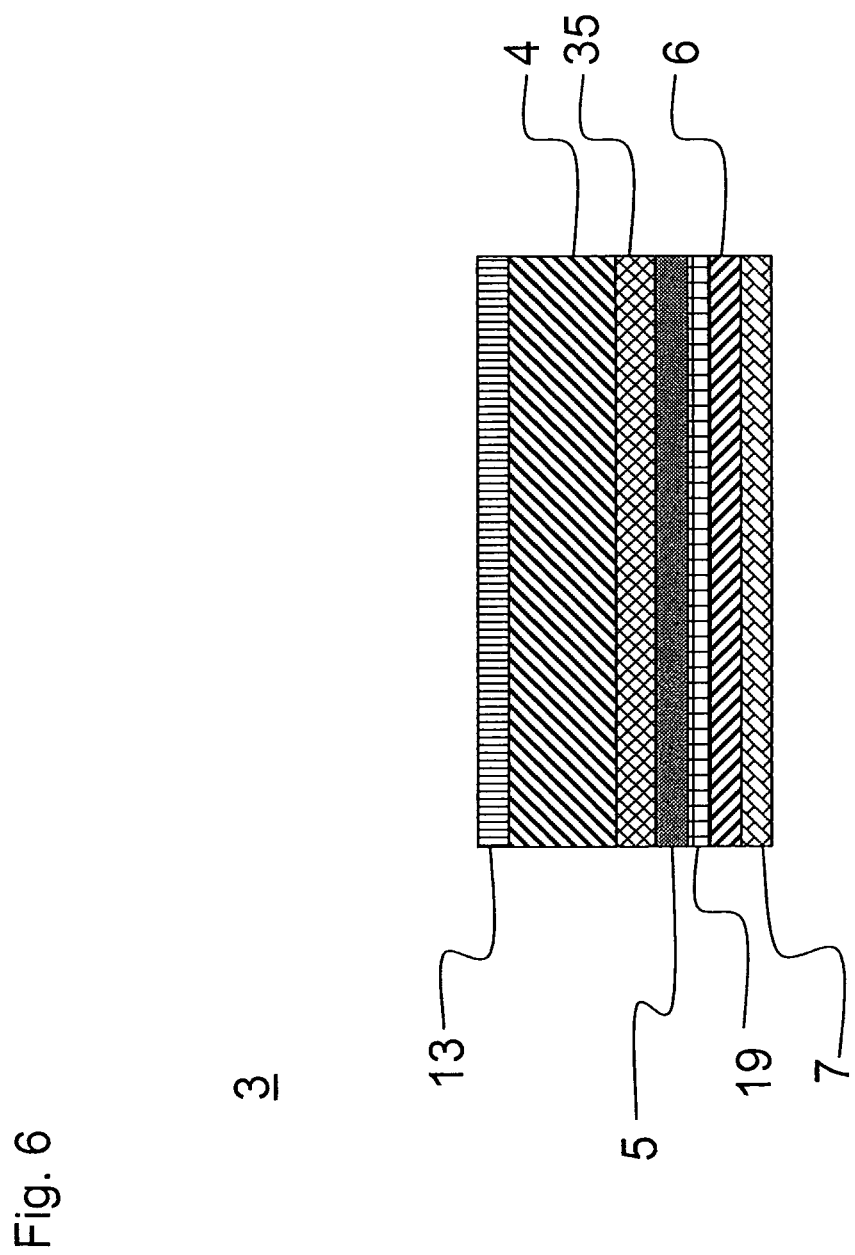

The present invention is now explained in more detail by these drawings given by way of example which do not limit it, the figures showing FIG. 1 a schematic view of a container produced by the process according to the invention, FIG. 2 a schematic illustration of the process flow of the process according to the invention, FIG. 3 a schematic view of a region of a container to be produced by the process according to the invention, FIG. 4a a schematic illustration of folding by the process according to the invention, FIG. 4b a schematic illustration of a fold by the process according to the invention, FIG. 5a a schematic illustration along a section A-A in the unfolded state, FIG. 5b a schematic illustration along a section A-A in the folded state, FIG. 6 a schematic illustration of a sheetlike composite which can be employed in the process according to the invention, FIG. 7 a schematic illustration of a sheetlike composite which can be employed in the process according to the invention, FIG. 8a a schematic illustration of a sonotrode-anvil arrangement before the sealing, FIG. 8b a schematic illustration of a sonotrode-anvil arrangement during and at the end of the sealing, FIG. 9a extrusion process (top view)

FIG. 9b extrusion process (side view)

FIG. 1 shows a container 2 surrounding an interior 1 and made of a sheetlike composite 3. The container 2 is shown with the container upper side 12 facing upwards. The container 2 is made of the sheetlike composite 3 which includes at least the carrier layer 4. The container 2 can furthermore include a hole 36.

FIG. 2 shows a schematic flow of devices and production steps by the process according to the invention. In a composite production 20, the sheetlike composite 3 is thus produced from a carrier layer 4, a barrier layer 5 and the layers of thermoplastic KSa 6, KSv 35 and KSw 7 and optionally a further layer of thermoplastic KSu 13 and—if necessary—at least one adhesion promoter layer 19 by an extrusion process and is usually provided as roll goods. In a composite fabrication 21 which follows the composite production 20 indirectly or directly, the score 14 is produced in the roll goods, which can have been provided with an imprint or decoration beforehand. Furthermore, if the roll goods provided with scores 14 are not employed as such for the production of containers, container blanks are produced in the composite fabrication 21. The composite fabrication 21 is followed by a container production 22, in which in particular the folding and joining are carried out by the process according to the invention. Filling with a foodstuff can also be carried out here.

FIG. 3 shows a container 2 formed during the process according to the invention, which—for a better view—is shown with a container region 23 envisaged for a base 12 on the top. The container region 23 envisaged for the base 12 has a plurality of scores 14.

FIG. 4a shows the cross-section through a sheetlike composite 3 with a score 14, formed by a recess 24 and a bulge 25. An edge 17 of a folding tool 18 is provided above the recess 24, in order to engage in the recess 24, so that folding can be carried out around the edge 17 along the score 14, in order to obtain a fold 8 shown as a cross-section in FIG. 4b. This fold 8 has two fold surfaces 9 and 10 which enclose an angle g and are present as a part 15 of large area and a part 16 of small area. At least one layer of thermoplastic 6, 7 or 13 is melted in a part region 11 of the part 16 of small area. By pressing the fold surfaces 9, 10 together, reducing the angle μ, to 0°, the two fold surfaces 9, 10 are joined to one another by sealing.

FIG. 5a shows a section along the line A-A in FIG. 3, before folding, from a sheetlike composite 3 with scores 14. By edges 17 of folding tools 18 which engage in the scores 14 installed centrally on the front faces, the scores 14 are moved in the direction of the two arrows, as a result of which the folds 8 shown in FIG. 5b with the angles μ are formed. The section shown here through the outermost part to be folded of the container region envisaged for the base 12 of the container 2 has a part region 11 towards the interior 1 in which at least one layer of thermoplastic 6, 7 or 13 is melted. By pressing together the longitudinal sides 26, reducing the six angles μ to 0, the two inner surfaces 27 of the longitudinal sides 26 facing the interior 1 are joined to one another by sealing, in order thus to create the base 12.

FIG. 6 shows a sheetlike composite 3, the upper side lying on the outside of the container 2 produced therefrom and the under-side on the inside. The resulting construction from the outside inwards is as follows: layer of thermoplastic KSu 13 (usually PE optionally with a filler content of an inorganic salt) with a weight per unit area in a range of from 8 to 60 g/m², followed by a carrier layer 4 of cardboard with a weight per unit area in a range of from 120 to 400 g/m², followed by a layer of thermoplastic KSv 35, usually with a weight per unit area in a range of from 5 to 40 g/m², followed by a barrier layer 5, for example a barrier of plastic, with a weight per unit area in a range of from 2 to 120 g/m², followed by a layer of adhesion promoter 19 with a weight per unit area in a range of from 2 to 30 g/m², optionally followed by a layer of thermoplastic KSa 6, usually of PE, with a weight per unit area in a range of from 5 to 40 g/m², followed by a further layer of thermoplastic KSw 7, usually of a blend of PE and mPE, with a weight per unit area in a range of from 2 to 60 g/m².

In FIG. 7, the sheetlike composite from FIG. 6 is supplemented by a further layer 19 of adhesion promoter with a weight per unit area in a range of from 2 to 30 g/m² provided between the barrier layer 5, for example of a metal layer with a thickness of 3-12 μm, and the carrier layer 4.

FIG. 8a shows a folded composite region 30 of the sheetlike composite 3 between a sonotrode 28 and an anvil 34, both of which each have a surface relief 29. The folded composite region is formed by further reduction of the angle μ. in the context of the folding shown in FIG. 5b and often has an intermediate space 33 in the regions with few layers. The surface relief 29 is configured such that recesses 33 in the surface relief 29 are opposite the multilayer regions 31 of greater thickness formed during folding, in order to allow a distribution of pressure and mechanical vibration over the sonotrode 28 which is as uniform as possible. Furthermore, the fixing of the folded composite region 30 to be joined, until the intermediate space 33 disappears, is improved in this way. The sonotrode 28 moves to the anvil 34 in the direction of the arrow, a pressure acting on the folded composite region 30 to be joined, which is held between the surface reliefs 29. By this means, the folded composite region, as shown in FIG. 8b, is pressed together and held according to the surface relief, so that the mechanical ultrasound vibration generated by the sonotrode 28 is transmitted to the folded composite 30 and joining by sealing takes place, in that the molten layers of plastic at least partly flow into one another due to the pressing pressure and solidify again by cooling, usually in a holding time, before the sonotrode 28 has released the folded composite region 30 treated in this way.

FIG. 9 shows the coating process preferred according to the invention schematically a. in the front view and b. in the side view. The coating film in the molten state 39 exits the extruder die slot 38 of the extruder die 37 and is applied to the carrier layer 4 via the cooling and pressing rolls 41. The coating film forms the surface F which comprises the polymers P1 42 and P2 43, the polymer P2 43 forming the edge regions of the surface F. The edge surfaces P2 43 of the surface F are preferably separated off from the surface F by cutting tools 44, preferably shearing blades. The molten coating film 39 exits the extruder die 37 with the speed $V_{exit}$ and is accelerated to the speed $V_{adv}$ by the cooling and pressing rolls and thus stretched monoaxially.

List of Reference Symbols

| | | | |
|---|---|---|---|
| 1 | Interior | 23 | Container region |
| 2 | Container | 24 | Recess |
| 3 | Sheetlike composite | 25 | Bulge |
| 4 | Carrier layer | 26 | Longitudinal sides |
| 5 | Barrier layer | 27 | Inner surface |
| 6 | Layer of thermoplastic KSa | 28 | Sonotrode |
| 7 | Layer of thermoplastic KSw | 29 | Surface relief |
| 8 | Fold | 30 | Folded composite region |
| 9 | Fold surface | 31 | Multilayer region |
| 10 | Further fold surface | 32 | Intermediate space |
| 11 | Part region | 33 | Recesses |
| 12 | Container upper side | 34 | Anvil |
| 13 | Layer of thermoplastic KSu | 35 | Layer of thermoplastic KSv |
| 14 | Score | 36 | Opening/perforation |
| 15 | Part with large area | 37 | Extruder die |
| 16 | Part with small area | 38 | Extruder die slot |
| 17 | Edge | 39 | Coating film (molten) |
| 18 | Folding tool | 40 | Coating film (thermofixed) |
| 19 | Adhesion promoter | 41 | Cooling roll, pressing roll |
| 20 | Composite production | 42 | Polymer P1 |
| 21 | Composite fabrication | 43 | Polymer P2 |
| 22 | Container production | 44 | Cutting device |

The invention claimed is:

1. A sheetlike composite comprising a layer configuration with the following layers:
   o. optionally a layer of thermoplastic KSu;
   i. a carrier layer;
   ii. a first layer of thermoplastic KSv;
   iii. a barrier layer;
   iv. a second layer of thermoplastic KSa; and
   v. at least one further layer of thermoplastic KSw;
   wherein the Vicat softening temperature of the layer of thermoplastic KSv and the Vicat softening temperature of the layer of thermoplastic KSa is in each case higher than the Vicat softening temperature of the layer of thermoplastic KSw.

2. The sheetlike composite according to claim 1, wherein the Vicat softening temperature of the layer of thermoplastic KSv and the Vicat softening temperature of the layer of thermoplastic KSa is in each case higher than the Vicat softening temperature of the layer of thermoplastic KSw by at least 4 K.

3. The sheetlike composite according to claim 1, wherein the melting temperature of the layer of thermoplastic KSv and the melting temperature of the layer of thermoplastic KSa is in each case higher than the melting temperature of the layer of thermoplastic KSw.

4. The sheetlike composite according to claim 3, wherein the melting temperature of the layer of thermoplastic KSv and the melting temperature of the layer of thermoplastic KSa is in each case higher than the melting temperature of the layer of thermoplastic KSw by at least 3 K.

5. The sheetlike composite according to claim 1, wherein the modulus of the difference between the Vicat softening temperature of the layer of thermoplastic KSv and the Vicat softening temperature of the layer of thermoplastic KSa is in a range of from 0 to 10 K.

6. The sheetlike composite according to claim 1, wherein the modulus of the difference between the melting temperature of the layer of thermoplastic KSv and the melting temperature of the layer of thermoplastic KSa is in a range of from 0 to 10 K.

7. The sheetlike composite according to claim 1, wherein at least one of the layers of thermoplastic KSu, KSv, KSa or KSw is made of a polyethylene or a polypropylene or a mixture of at least two of these.

8. The sheetlike composite according to claim 1, wherein at least one of the layers of plastic KSu, KSv, KSa or KSw comprises at least one polyolefin with a mass density in a range of from 0.925 g/cm$^3$ to 0.980 g/cm$^3$ in a range of from 20 wt. % to 100 wt. %, in each case based on the total weight of the layer of plastic.

9. The sheetlike composite according to claim 1, wherein the barrier layer is chosen from
   a. a barrier layer of plastic, or
   b. a metal layer, or
   c. a metal oxide layer, or
   d. a combination of at least two of a. to c.

10. The sheetlike composite according to claim 1, wherein the carrier layer has at least one hole which is covered at least with the barrier layer and at least with one of the layers of thermoplastic KSa or KSw as hole-covering layers.

11. A container surrounding an interior, comprising at least one sheetlike composite according to claim 1.

12. The sheetlike composite according to claim 1, wherein at least one of the layers of thermoplastic KSu, KSv, KSa or KSw is a plastics mixture of at least two plastics.

13. The sheetlike composite according to claim 12, wherein the plastics mixture of at least one layer of thermoplastic contains as one of at least two mixture components a polyolefin prepared by means of a metallocene.

14. A process for the production of a container surrounding an interior, comprising the process steps a. providing a sheetlike composite comprising a layer configuration with the following layers:
   o. optionally a layer of thermoplastic KSu of a plastics composition KSum;
   i. a carrier layer;
   ii. a first layer of thermoplastic KSv of a plastics composition KSvm;
   iii. a barrier layer;
   iv. a second layer of thermoplastic KSa of a plastics composition KSam; and
   v. a further layer of thermoplastic KSw of a plastics composition KSwm;
   wherein the Vicat softening temperature of the plastics composition KSvm and the Vicat softening temperature of the plastics composition KSam is in each case higher than the Vicat softening temperature of the plastics composition KSwm;
b. folding the sheetlike composite to form a fold with at least two fold surfaces adjacent to one another, wherein layer v. faces the interior of the container;
c. joining at least a part region of the at least two fold surfaces to form a container region.

15. The process according to claim 14, wherein at least one of the layers of thermoplastic KSu, KSv, KSa or KSw in step b. is heated above its melting temperature.

16. The process according to claim 14, wherein at least one of the layers of thermoplastic KSu, KSv, KSa or KSw in step b. has a temperature which is below its melting temperature.

17. The process according to claim 14, wherein at least one of the layers of thermoplastic KSu, KSv, KSa or KSw has a melting temperature below the melting temperature of the barrier layer.

18. The process according to claim 14, wherein the fold surfaces form an angle μ of less than 90°.

19. The process according to claim 14, wherein the joining according to step c. is carried out by sealing by means of at least one of the layers of thermoplastic KSu, KSa or KSw.

20. The process according to claim 14, wherein the container is filled with a foodstuff before step b. or after step c.

21. The process according to claim 14, wherein a further folding follows step c. as step d., and wherein, in the further folding in step d., at least one of the layers of thermoplastic KSu, KSv, KSa or KSw has a temperature which is below the melting temperature of this layer of plastic.

22. The process according to claim 14, wherein at least one of the layers of thermoplastic KSu, KSv, KSa or KSw is produced by extrusion of at least one polymer P1 through a slot die to obtain an emerging surface, at least one polymer P2 which differs from polymer P1 being provided on the flanks of the emerging surface of the at least one polymer P1 emerging from the slot die.

23. The process according to claim 22, wherein the emerging surface is cooled to a temperature below the lowest melting temperature of the polymer P2, and at least the flanks of the emerging surface are then separated off from the emerging surface.

24. The process according to claim 14, wherein at least one of the layers of thermoplastic KSu, KSa or KSw is heated above its melting temperature directly before step c.

25. The process according to claim 24, wherein the heating is carried out by irradiation, contact with a hot solid or hot gas, or a combination thereof.

26. The process according to claim 24, wherein the heating is carried out by a mechanical vibration.

27. The process according claim 26, wherein the heating is carried out by ultrasound.

28. The process according to claim 14, wherein the sheetlike composite has at least one score and the fold is effected along the score.

29. The process according to claim 28, wherein the score demarcates the sheetlike composite into a part of large area and a part of small area compared with the part of large area.

30. A container obtainable by a process according to claim 14.

* * * * *